United States Patent [19]

Saunders, Jr. et al.

[11] Patent Number: 4,482,691
[45] Date of Patent: Nov. 13, 1984

[54] AIR-DRYING FATTY ACID-MODIFIED ACRYLIC RESINS

[75] Inventors: John B. Saunders, Jr., Allison Park; Karl F. Schimmel, Verona; Rostyslaw Dowbenko, Gibsonia, all of Pa.

[73] Assignee: PPG Industries, Inc., Pittsburgh, Pa.

[21] Appl. No.: 535,006

[22] Filed: Sep. 22, 1983

[51] Int. Cl.$^3$ .................... C09D 3/58; C09D 3/80; C09D 3/72; C09D 3/74
[52] U.S. Cl. .................... 528/69; 252/182; 502/102; 428/423.1; 427/386
[58] Field of Search ............. 526/273; 528/69, 74.5; 252/182, 431 C, 431 R

[56] References Cited

U.S. PATENT DOCUMENTS

| 2,374,136 | 4/1945 | Rothrock | 528/74.5 |
|---|---|---|---|
| 2,875,919 | 3/1959 | Henderson | 220/64 |
| 3,522,218 | 7/1970 | Pedain et al. | 528/69 |
| 3,652,476 | 3/1972 | Fellers et al. | 526/273 |
| 3,682,688 | 8/1972 | Hughes et al. | 117/168 |
| 3,836,492 | 9/1974 | Watanabe et al. | 526/273 |
| 3,897,377 | 7/1975 | Broecker et al. | 528/74.5 |
| 4,056,495 | 11/1977 | Kawamura et al. | 428/458 |
| 4,174,434 | 11/1979 | Dieterich et al. | 528/69 |
| 4,327,008 | 4/1982 | Schimmel et al. | 528/69 |
| 4,348,498 | 9/1982 | Kamio et al. | 525/13 |
| 4,383,091 | 5/1983 | Burton | 528/69 |

FOREIGN PATENT DOCUMENTS

| 525905 | 6/1956 | Canada | 528/74.5 |
|---|---|---|---|
| 49-128996 | 12/1974 | Japan | 528/74.5 |

OTHER PUBLICATIONS

"Linseed Oil—Metal Acetylacetonate Systems", by Salotto et al, Journal of Paint Technology, vol. 47, No. 601, Feb. 1975, pp. 36–40.

"Organo–Titanates in Printing Inks", by Rummo, American Ink Maker, May 1982, pp. 17, 18, 44 and 45.

Primary Examiner—Ronald W. Griffin
Attorney, Agent, or Firm—Godfried R. Akorli

[57] ABSTRACT

Air-drying fatty acid-modified acrylic resins and oxidizable resinous vehicles containing same, and a novel drier system comprising a coordination complex of titanium and cobalt are herein disclosed.

15 Claims, No Drawings

AIR-DRYING FATTY ACID-MODIFIED ACRYLIC RESINS

BACKGROUND OF THE INVENTION

1. Field of the Invention

The present invention relates to air-drying fatty acid-modified acrylic resins. More specifically, the acrylic resins comprise copolymers of glycidyl (meth) acrylates and other appropriate ethylenically unsaturated monomers which are reacted with fatty acids and subsequently reacted with isocyanates. The invention further relates to the combination of the acrylic resins with a novel catalyst system comprising a primary drier and an activator for said drier comprising a coordination complex of titanium.

Generally, the use of fatty acid-modified acrylic resins as film-formers is known in the art. However, films formed therefrom have been known to have shortcomings, pertinent among which is poor caustic resistance. Hence, there is a need for preparing fatty acid-modified acrylic resins which have improved caustic resistance properties as well as other desirable composition, coating and film properties.

The cure of compositions containing these resins is aided by catalysts or driers which are typically hydrocarbon soluble salts of selected metals. Illustratively, metal salts such as octoates, naphthanates, linoleates, neodecanoates have been used as catalysts or primary driers. Auxiliary driers which are believed to have an activating effect on the primary driers are also employed. Hence, they are alternately referred to as activators. Typical examples of the activators are calcium, barium, and zinc salts. Over recent years, it has become common practice to add selected compounds to surface coatings to increase the efficiency of the metallic driers. These compounds have in common the ability to form coordination complexes with transition metal ions. Typical of the complexing agents is 1:10 phenanthroline.

The present invention provides a new drier activator comprising a coordination complex of titanium. U.S. patent application Ser. No. 534,948, filed even-date, relates to the coordination complex of titanium as a drier activator.

2. Summary of the Invention

In accordance with the foregoing, the present invention encompasses an air-drying fatty acid-modified vinyl polymerized resin comprising:
(i) a copolymer of ethylenically unsaturated monomers, at least one of which contains an epoxy group, which has been esterified with
(ii) an air-drying fatty acid with the resultant formation of hydroxyl group(s) which are reacted with a monoisocyanate.

The present invention further encompasses a curable composition comprising the afore-stated vinyl polymerized resin in combination with a drier catalyst system, comprising a drier which is typically a metal salt and a drier activator which is a coordination complex of titanium.

A presently preferred embodiment of the catalyst system comprises the coordination complex of titanium, which is titanium II diisopropyldiacetoacetonate (hereinafter Ti II AcAc). In a particularly preferred embodiment of the catalyst system, the Ti II AcAc is used with cobalt salt as the primary drier (hereinafter the term "cobalt" or "Co" denotes cobalt salt). Also, the present invention encompasses a method of air drying curable compositions containing the instant acrylic resin with art-known catalyst systems or with the instant catalyst system. Articles of matter coated with said compositions are also encompassed.

It has been found that coating compositions comprising the resins of this invention are stable, and form air-dried films which have excellent properties. The films have excellent color, gloss, water resistance, solvent resistance, exterior durability, caustic resistance and other desirable properties. It has also been found that the coating compositions comprising the aforestated drier catalyst system are stable and cure in a remarkably short period of time to tack-free and through-cure state.

DETAILED DESCRIPTION OF THE INVENTION

The air-drying fatty acid-modified acrylic resin can be prepared by first copolymerizing an ethylenically unsaturated monomer containing an epoxy group appropriately with another monomer or with other monomers. Non-limiting examples of monomers containing an epoxy group are glycidyl acrylate and glycidyl methacrylate. Examples of the other monomers are vinyl monomers such as vinyl acetate, isopropenyl acetate, dimethyl maleate; vinyl aromatic monomers such as styrene and alpha-methylstyrene; acrylic monomers such as acrylic or methacrylic acid; or the esters thereof such as ethyl acrylate and methyl methacrylate; or the amides or alkoxyalkylamides thereof such as acrylamide, methacrylamide, or N-butoxymethylacrylamide, N-ethoxymethylacrylamide; and the like.

The copolymerization is conducted under free radical vinyl addition polymerization conditions which are known in the art. The quantity and/or quality of a particular monomer depends on cost, availability and the intended use of the resultant resin. For example, the monomer containing an epoxy group is used in an amount ranging typically from about 10 to 40, and preferably from about 15 to 30 percent by weight. The percentage composition of the monomers is based on total weight of resin solids.

After the copolymerization, the resultant copolymer is reacted with an air-drying fatty acid to form an ester group and a hydroxyl group.

Non-limiting examples of the air-drying fatty acids are those obtained from dehydrated castor oil, linseed oil, soya oil, tung oil and the like. Typically, the copolymer is reacted with the fatty acid in an equivalent ratio of 0.1 to 0.9:1 of the epoxy group to the acid group. The reaction is carried out at temperatures ranging from about 60° to 200° C., preferably in the range of about 100° to 170° C., in organic solvents such as methyl amyl ketone, xylene, butyl acetate and toluene.

Subsequent to the above, the resultant fatty acid-modified acrylic resin is reacted with an isocyanate via the formed hydroxyl groups. Non-limiting examples of isocyanates are monoisocyanates such as aromatic isocyanates, e.g., phenyl isocyanate; aliphatic isocyanates, cyclohexyl isocyanate, and t-butyl and n-butyl isocyanate. This reaction is believed to effect consumption of the formed hydroxyl group in the fatty acid-modified acrylic as afore-stated. It is believed that the consumption of the hydroxyl groups in certain amounts improves caustic resistance of the resin. Typically, the hydroxyl group is reacted with a monoisocyanate in an equivalent ratio of 0.15 to 0.85:1 of the hydroxyl group to the isocyanate group. The reaction is carried out at temperatures ranging from about 40° to 80° C.

While monoisocyanates have been specifically described and typically employed, polyisocyanates can be employed, preferably in conjunction with the monoisocyanates. In certain instances, one or more of the isocyanato groups of the polyisocyanate could be defunctionalized before it is reacted with the resin.

It is a feature of the invention that the instant air-drying fatty acid-modified acrylic resins which are subsequently reacted with isocyanates, as afore-described, possess excellent properties of caustic resistance. In addition, these resins have the following features and advantages.

It has been found that the instant fatty acid-modified resins which are further reacted with isocyanates as afore-stated require relatively smaller amounts of drying catalysts, particularly those comprising the preferred complex of titanium. Advantageously, resinous vehicles containing the relatively smaller amounts of drying catalyst, and films formed therewith, are characterized by good hydrolytic stability. Also, films obtained therefrom possess excellent exterior durability as well as other desirable properties.

Surprisingly, it has been found that in certain embodiments, cured coatings of the instant fatty acid-modified resins which have been reacted with phenyl isocyanate (an aromatic isocyanate) are not attended by yellowing problems. In addition, curable compositions comprising the catalyst systems of this invention can be formulated to have high percentage compositions of resin solids ranging to about 90 percent by weight based on the total weight of the composition. It has been found that even with the high solids content, coating compositions, in accordance with this invention, air-dry in a remarkably short period of time.

As would be realized, there can be adopted alternate methods of preparing the fatty acid-modified acrylic resin. For example, an ethylenically unsaturated monomer containing an epoxy group can be "pre-reacted"-'with an air-drying fatty acid, via the epoxy group. The reaction would be such as would yield a copolymerizable monomer. This monomer could be copolymerized with an appropriate monomer and the resultant copolymer could be reacted with an isocyanate to form the instant fatty acid-modified acrylic resin. This and other methods are encompassed by this invention.

In curing the above resins by air-drying, various drier catalyst systems can be employed. It has, however, been found that a catalyst drier system comprising a coordination complex of titanium as a drier activator, is particularly suited to air drying the resin to a tack-free and throughdry state in a remarkably short period of time.

As set forth hereinabove, the drier activator, in one embodiment of the invention, comprises a coordination complex of titanium. A class of the coordination complex of titanium can be prepared by reacting esters of ortho titanic acid such as tetraalkyl, e.g., tetramethyl, tetraethyl, tetrapropyl, tetrabutyl, tetracyclohexyl, tetraphenyl; tetraallyl; tetraaryl, e.g., tetranaphthyl (beta) esters with amino alcohols, amino phenols, amino naphthols, glycols, organic acids, certain aldehydes, ketones and the like. The coordination complexes are most readily formed and exhibit maximum stability when the complex linkage is included in a 5 or 6-membered ring. For example, a class of the coordination complex of titanium can be prepared by reacting a titanium ortho ester such as tetraisopropyl, preferred herein, or tetraisobutyl titanate with a glycol of the formula:

$$R-CHOH-CH-CH_2OH$$
$$\phantom{R-CHOH-}|$$
$$\phantom{R-CHOH-}R'$$

where R and R $\alpha$ are organic radicals such as alkyl, alkenyl, aryl, aralkyl or alkaryl, using a glycol:ester ratio from ½:1 to 4:1. The coordination complex of titanium is preferably Ti II AcAc. It can be prepared by mixing acetylacetone with tetraisopropyl titanate at a temperature below 50° C. A principal component of the resultant composition is Ti II AcAc which is of the structure:

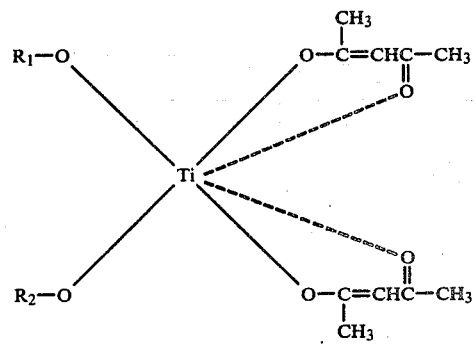

$R_1$ and $R_2$ are isopropyl groups in the case of Ti II AcAc. In accordance with this invention, $R_1$ and $R_2$, each independently, may be an organic radical such as an alkyl, alkenyl, or aryl group. The ketonic oxygen atoms are bonded to the titanium by secondary valences. These compounds have the property of hydrolyzing only very slowly in water at room temperature. They are soluble in isopropyl alcohol, benzene, trichloroethylene and similar solvents.

The amount of the coordination complex that is employed as a drier activator will depend on the particular metal drier as to its nature and amount and in some instances, on the resinous vehicles and other additives such as pigments. Generally put, the metal drier and the drier activator, respectively, are employed in amounts sufficient to effect drying in accordance with this invention.

It is expected that, broadly, certain coordination complexes of titanium will improve the activity of metal driers in effecting cure of oxidizable organic vehicles. In accordance with this invention, Ti II AcAc has been found to exhibit a substantial improvement in drier activity, particularly in curing films of high build. By substantial improvement in drier activity is meant that films of high build, i.e., from about 2 mils or higher, particularly films of about 2 to 4 mils build, dry to a tack-free and through-cure state in about 2 to 6 hours. Typically, the Ti II AcAc is employed in a composition in an amount of at least 0.1 percent by weight of titanium based on the total weight of resin solids of the composition. Preferably, Ti II AcAc is employed in an amount ranging from about 0.1 to 2.5, more preferably 0.1 to 1.5, and most preferably 0.1 to 0.3 percent by weight of titanium. The percent by weight is based on the total weight of the resin solid of the curable composition. Although amounts lower than afore-stated can be used, such use may adversely affect drying characteristics, such as rate of drying. Conversely, although amounts higher than afore-stated can be used, such use may produce adverse results as to some other film properties.

The primary metal driers useful herein are, by definition, those whose activity in enhanced by the instant drier activator. Illustrative examples of the primary metal driers are acid salts such as octoates, decanoates and nonadecanoates of metals which are typically transition metals such as cobalt, lead, iron and the like. They are employed in amounts sufficient to effect drying. In a particularly preferred embodiment of the invention, it has been found that the activity of cobalt drier is enhanced substantially by the Ti II AcAc. The cobalt drier is present preferably from about 0.001 to 1.0, more preferably, from 0.01 to 0.2, and most preferably from 0.01 to 0.06 percent by weight of cobalt metal. The percent by weight is based on the total weight of resin solid of the curable composition. It is a feature of the invention that with the use of Ti II AcAc, the amount of cobalt drier which is used can be reduced without adversely affecting the rate of drying of the oxidizable organic resinous vehicle used therewith.

In accordance with the foregoing, the invention is also embodied in a drier catalyst system comprising a primary metal drier and Ti II AcAc. Presently, the drier catalyst system comprises a metal drier consisting essentially of cobalt, and a drier activator consisting essentially of Ti II AcAc, and a solvent. The solvents useful herein are those in which the primary drier and the drier activator are soluble. An example thereof is isopropanol. The drier catalyst system may contain other ingredients such as other metal salts, surfactants, and yet other additives. However, in a certain emobodiment of the invention, the drier catalyst system consists of the metal drier, the drier activator and the solvent only. Illustratively, in a particularly preferred embodiment, the drier catalyst system consists of cobalt, Ti II AcAc and a solvent which is isopropanol.

It has been found as another feature of this invention that, in using the instant drier catalyst system, curable compositions of high solids content can be formulated without a substantial effect on drying time of said compositions. Hence, curable compositions containing from 60 to 90 percent by weight solids can be formulated with the instant drier activators and drier catalyst systems. Drying times of the high solids compositions have been found to be remarkably shorter than drying times of art-related high solids compositions. It should be realized that the operability of the drier catalyst system would be specific as to the particular oxidizable organic resinous vehicle. With the oxidizable organic resinous vehicles disclosed and illustrated herein, the drier catalyst systems effect through drying of films of high build, in a relatively short period of time. The selection of the operable organic resinous vehicle can be made without undue experimentation.

While not desiring to be bound by any specific theory, it seems that the catalyst system is particularly effective in hydroxyl group-containing oxidizable organic resinous vehicles. Seemingly, there is an interaction between the hydroxyl group and the Ti II AcAc that leads to the enhanced rate of drying.

In preparing the curable compositions, the resinous vehicle, the metal drier and the drier activator can be admixed in any order at ambient temperatures. Preferably, the drier catalyst is prepared first and then mixed with the resinous vehicle. The drier catalyst system can be prepared by combining the metal drier and the drier activator with or without a solvent. Preferably, the drier activator is thoroughly mixed into a solvent. Thereafter, the metal drier is introduced and thoroughly blended in the resultant mixture.

The resultant curable compositions may contain additives such as pigments, extenders, stabilizers, defoamers, anti-skinning and other common additives. The curable compositions are particularly useful as coating compositions.

In accordance with the foregoing, the present invention further encompasses a process for preparing a decorative or protective coating for a substrate. The process comprises applying to the substrate a composition containing an oxidizable organic resinous vehicle and a drier catalyst system. The application step is followed by drying the coated substrate advantageously at ambient temperatures or optionally forced-drying by heating at relatively low temperatures or even by baking at relatively higher temperatures.

These and other aspects of the invention are more fully described by the following non-limiting examples.

EXAMPLE 1

This example illustrates the preparation of coating compositions of this invention comprising fatty acid-modified acrylic resins, which are subsequently reacted with an isocyanate. The example further illustrates the cure of these resins with a novel catalyst system.

PART 1

The following were used in the preparation of the fatty acid-modified acrylic resin:

| Charge I | |
|---|---|
| Ingredients | Parts by Weight (grams) |
| Methyl amyl ketone | 232.9 |

| Charge II | |
|---|---|
| Ingredients | Parts by Weight (grams) |
| VAZO 67[1] | 51.8 |
| Methyl amyl ketone | 198 |
| Methyl amyl ketone (rinse) | 11.3 |

[1]2,2'-azobis(2,4-dimethylvaleronitrile).

| Charge III | |
|---|---|
| Ingredients | Parts by Weight (grams) |
| Isobutyl methacrylate | 449.3 |
| Glycidyl methacrylate | 384.35 |
| Styrene | 88.3 |
| Methyl amyl ketone (rinse) | 11.3 |

| Charge IV | |
|---|---|
| Ingredients | Parts by Weight (grams) |
| Styrene | 20.2 |
| Methyl amyl ketone (rinse) | 11.3 |

| Charge V | |
| --- | --- |
| Ingredients | Parts by Weight (grams) |
| 9,11 Acid[2] | 683.3 |
| Methyl amyl ketone (rinse) | 11.3 |

[2]Unsaturated acid, derived from dehydrated castor oil.

In a properly equipped reaction vessel, Charge I was heated under a nitrogen blanket to a temperature of 145° C. and Charges II, III, IV and V were added as follows. The addition of Charges II and III was commenced at the same time and continued at constant rates over periods of 2¾ hours and 2 hours, respectively. Upon completion of the addition of Charge III, the addition of Charge IV was commenced and conducted over a period of 15 minutes. The resultant mixture was held for one hour, thereafter Charge V was added and held until an acid value of less than 1 was attained. The resultant composition comprising the fatty acid-modified resin was allowed to cool, discharged and stored. The composition had a solids content of 76.7 percent, viscosity of $Z^{2+}$ and weight per gallon of 8.179.

PART 2

The fatty acid-modified resin was subsequently reacted with phenyl isocyanate, as follows.

| Ingredients | Parts by Weight (grams) |
| --- | --- |
| The above fatty acid-modified resin | 820 |
| Phenyl isocyanate | 95.3 |

The fatty acid-modified acrylic resin was charged to a properly equipped reaction vessel (with a nitrogen blanket) and heated to 85° C. Addition of the phenyl isocyanate was commenced and continued at a constant rate over a period of an hour, with the reaction temperature kept at 145° C. The progress of the reaction was monitored by infra-red spectroscopy. Upon completion of the reaction, the mixture was cooled and discharged. Analysis: solids: 78.3%, viscosity: 106.9 stokes, color: 1, epoxy equivalent: 5488, hydroxyl value: 22.8, weight/gallon: 8.37 pounds.

PART 3

The above resin was blended with the novel drier catalyst system of this invention to produce a curable compositon, as follows.

| Ingredients | Parts by Weight (grams) |
| --- | --- |
| Fatty acid-modified acrylic resin (from above) | 412.00 |
| Methyl amyl ketone | 53.00 |
| Methyl isobutyl ketone | 30.00 |
| Isopropanol | 40.00 |

| Drier Catalyst System | |
| --- | --- |
| Ingredients | Parts by Weight (grams) |
| Isopropanol | 10.00 |
| Ti II AcAc[1] | 3.57 |
| CO-HYDRO-CURE II[2] | 0.35 |

[1]Available from duPont Chemicals.
[2]Cobalt salt as primary drier, available as TENCHEM from Mooney Chemicals.

Into a properly equipped reaction vessel was charged the resin to which was added the methyl amyl ketone, the methyl isobutyl ketone and the isopropanol and mixed thoroughly with agitation. To this mixture was added a premix of isopropanol, Ti II AcAc and CO-HYDRO-CURE II. The resultant mixture was mixed thoroughly and used in coating substrates and then evaluated for rate of drying and other drying characteristics.

The evaluation comprised dipping the steel substrates into the curable composition to form films of about 2–4 mils thickness. The films were exposed to air at ambient temperature, at 30–60 percent relative humidity. Tack-free (drying) times and drying characteristics such as through-cure, surface cure, blooming and gloss were determined by monitoring the films and ascertaining the amount of flattening and/or peel-off of the films as a function of time. Caustic resistance was determined with liquid 3 percent NaOH under a watch glass which was placed on the air-dried coating and observed for deterioration of the coating.

Results: The films became tack-free in about 1 to 1½ hours, dried through in about 3 to 6 hours. Additionally, the dried films displayed excellent caustic resistance in 7 days of air drying.

EXAMPLE 2

This example shows a coating composition comprising a fatty acid-modified acrylic resin which was subsequently reacted with cyclohexyl isocyanate.

The fatty acid-modified acrylic resin which was the same as described in Example 1, Part 1, was reacted with cyclohexyl isocyanate, as follows.

| Ingredients | Parts by Weight (grams) |
| --- | --- |
| Fatty acid-modified acrylic resin of Example 1, Part 1 | 3564 |
| Cyclohexyl isocyanate | 435 |

The preparation was essentially the same as described in Example 1, Part 2. The resultant isocyanate-modified resin was blended with the novel catalyst system to form a coating composition, as follows:

| Ingredients | Parts by Weight (grams) |
| --- | --- |
| Isocyanate-modified resin (from above) | 416.00 |
| Methyl amyl ketone | 53.00 |
| Methyl isobutyl ketone | 30.00 |
| Isopropanol | 40.00 |

| Drier Catalyst System | |
| --- | --- |
| Ingredients | Parts by Weight (grams) |
| Isopropanol | 10 |
| Ti II AcAc | 3.57 |
| CO-HYDRO-CURE II | 0.71 |

The preparation and evaluation of the composition was essentially the same as described in Example 1, Part 3. Substrates coated with this composition air dried to a tack-free state in about 1 to 1½ hours and through-dry state in about 3 to 6 hours.

EXAMPLE 3

This example also shows the preparation and use of a coating composition comprising a fatty acid-modified acrylic resin which was subsequently reacted with phenyl isocyanate.

The fatty acid-modified acrylic resin which was the same as described in Example 1, Part 1, was reacted with phenyl isocyanate, as follows:

| Ingredients | Parts by Weight (grams) |
|---|---|
| Fatty acid-modified acrylic resin (as described above) | 1379.9 |
| Phenyl isocyanate | 120.1 |

The preparation was essentially the same as described in Example 1, Part 2. The resultant isocyanate-modified resin was blended with the novel catalyst system to form the coating composition, as follows:

| Ingredients | Parts by Weight (grams) |
|---|---|
| Fatty acid-modified acrylic resin (from above) | 420.00 |
| Methyl amyl ketone | 53.00 |
| Methyl isobutyl ketone | 30.00 |
| Isopropanol | 40.00 |

| Catalyst System | |
|---|---|
| Ingredients | Parts by Weight (grams) |
| Isopropanol | 10.00 |
| Ti II AcAc | 4.63 |
| CO-HYDRO-CURE II | 0.36 |

The preparation and evaluation of the composition was conducted in essentially the same manner as described in Example 1, Part 3. Substrates coated with this composition air-dried to a tack-free state in about 1 to 1½ hours and through-dry state in about 3 to 6 hours.

Therefore, what is claimed is:

1. An air-drying fatty acid-modified vinyl polymerized resin comprising moieties derived from:
   (i) a copolymerizable monomer containing an epoxy group,
   (ii) an air-drying fatty acid which esterifies through the epoxy group to form hydroxyl group(s),
   (iii) an isocyanate consisting essentially of a monoisocyanate which reacts, partially, with the formed hydroxyl group(s), and
   (iv) another copolymerizable monomer which is different from (i).

2. An air-drying fatty acid-modified vinyl polymerized resin, comprising:
   (i) a copolymer of ethylenically unsaturated monomers, at least one of which contains an epoxy group, which has been esterified with
   (ii) an air-drying fatty acid with the resultant formation of hydroxyl group(s) which are reacted with an isocyanate consisting essentially of a monoisocyanate.

3. A resin of claim 1 or 2, wherein the ethylenically unsaturated monomer containing an epoxy group is glycidyl(meth)acrylate.

4. A resin as in claim 1 or 2, wherein the fatty acid is obtained from dehydrated castor oil, linseed oil, soya oil or tung oil.

5. A resin as recited in claim 1 or 2, wherein the copolymer is reacted with the fatty acid in an equivalent ratio of 0.1 to 0.9:1 of the acid group to the epoxy group.

6. A resin as recited in claim 1 or 2, wherein the isocyanate is a monoisocyanate which is phenyl, cyclohexyl, n-butyl or t-butyl isocyanate.

7. A resin as recited in claim 1 or 2, wherein the formed hydroxyl group is reacted with a monoisocyanate in an equivalent ratio of 0.15 to 0.85:1 of the isocyanate group to the hydroxyl group.

8. An air-curable composition which comprises:
   (i) an air-drying fatty acid-modified vinyl polymerized resin of claim 1 or 2,
   (ii) a metal drier, and
   (iii) a drier activator comprising a coordination complex of titanium.

9. A composition of claim 8, wherein the drier is a cobalt salt.

10. A composition of claim 8, wherein the coordination complex of titanium is titanium II diisopropyldiacetoacetonate.

11. A composition of claim 8, wherein the metal drier and drier activator are present in an amount by weight metal which is sufficient to effect drying of the composition; the percent by weight is based on the total weight of resin solids of the composition.

12. A composition of claim 8, wherein the metal salt drier is cobalt which is present in an amount of at least 0.0025 percent by weight, and the drier activator is titanium II diisopropyldiacetoacetonate which is present in an amount of at least 0.1 percent by weight, the percent by weight is based on the total weight of resin solids of the composition.

13. A coating composition as recited in claim 8, having a resin solids content of 60 to 90 percent by weight.

14. A process for preparing a decorative or protective coating for a substrate, said process comprises:
   (1) applying to the substrate a composition as recited in claim 8, followed by curing the substrate by drying at ambient temperature, or baking.

15. An article of matter which is prepared by the process of claim 14.

* * * * *